(12) United States Patent
Wada et al.

(10) Patent No.: US 6,515,597 B1
(45) Date of Patent: Feb. 4, 2003

(54) VICINITY DISPLAY FOR CAR

(75) Inventors: Jyoji Wada, Yokohama (JP); Masami Takahashi, Zushi (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/937,515

(22) PCT Filed: Jan. 29, 2000

(86) PCT No.: PCT/JP01/00580

§ 371 (c)(1),
(2), (4) Date: Sep. 25, 2001

(87) PCT Pub. No.: WO01/58164

PCT Pub. Date: Aug. 9, 2001

(30) Foreign Application Priority Data

Jan. 31, 2000 (JP) ........................................ 2000-022697

(51) Int. Cl.[7] ............................................. G08G 1/123
(52) U.S. Cl. ...................... 340/988; 340/901; 340/903; 340/439; 340/995; 348/135; 348/143; 348/148; 348/149
(58) Field of Search ................................. 340/988, 901, 340/903, 435, 995; 348/135, 143, 148, 149

(56) References Cited

U.S. PATENT DOCUMENTS

| | | | | |
|---|---|---|---|---|
| 5,670,935 A | * | 9/1997 | Schofield et al. | 340/461 |
| 5,798,575 A | * | 8/1998 | O'Farrell et al. | 307/10.1 |
| 6,115,651 A | * | 9/2000 | Cruz | 701/1 |
| 6,122,597 A | * | 9/2000 | Saneyyoshi et al. | 701/301 |
| 6,169,572 B1 | * | 1/2001 | Sogawa | 348/113 |
| 6,370,261 B1 | * | 4/2002 | Hanawa | 382/104 |

FOREIGN PATENT DOCUMENTS

| | | |
|---|---|---|
| JP | 7-83693 | 3/1995 |
| JP | 7-329638 | 12/1995 |
| JP | 10-217852 | 8/1998 |
| JP | 11-44548 | 2/1999 |
| JP | 11-72342 | 3/1999 |
| JP | 11-160080 | 6/1999 |

\* cited by examiner

Primary Examiner—Daniel J. Wu
Assistant Examiner—Tai T. Nguyen
(74) Attorney, Agent, or Firm—Pearne & Gordon LLP

(57) ABSTRACT

A vehicle peripheral-area display apparatus comprising: a camera (11) for picking up images of a peripheral area of a vehicle (2); an integration processing unit (21) for detecting the vehicle's own position as positional information via a vehicle sensor (12); a memory (15) for storing present picture data as to the peripheral area of the vehicle picked up by the camera (11), and also for storing positional information as to the picked up images of peripheral area of the vehicle; a picture composite unit (25) for reading past picture data corresponding to the positional information from the memory (15) by way of a memory control unit (24), and for combining own vehicle shape data "x" with this past picture data; and a display control unit (26) for displaying the picture data combined by this picture composite process unit (25) on a monitor display unit (16). As a result, this vehicle peripheral-area display apparatus of the present invention can display not only the road surface of the lower portion of the vehicle body of this vehicle, but also the past peripheral-area.

7 Claims, 4 Drawing Sheets

VICINITY DISPLAY FOR CAR

TECHNICAL FIELD

The present invention is related to a vehicle peripheral-area display apparatus for picking-up an image of a peripheral area of a vehicle by operating a camera mounted on this vehicle, and for displaying the image of this picked up peripheral area of the vehicle on a monitor display unit.

BACKGROUND ART

Conventionally, as such a vehicle peripheral-area display apparatus, while a plurality of cameras are mounted on a vehicle in order to pick up an image of a peripheral area of this vehicle, image data having different view angles and acquired by these plural cameras are combined with each other, so that the peripheral area of the vehicle is displayed on a monitor display unit contained in the vehicle.

However, in accordance with the above-explained conventional vehicle peripheral-area display apparatus, there is a problem in order to monitor-display the peripheral-area of the vehicle. That is, a plurality of cameras used to pick up images regarding all of the peripheral areas of the vehicle should be mounted.

Also, in accordance with the above-described conventional vehicle peripheral-area display apparatus, although the peripheral-area of the vehicle can be monitor-displayed in real time, for instance, considering a mounting position of such a camera used to pick up an image of a road surface of a lower portion of a vehicle body of this vehicle, this road surface of the lower portion of the vehicle body could not be monitor-displayed. Furthermore, there is another problem that the peripheral portion of the vehicle which has been picked up in the past could not be monitor-displayed.

The present invention has been made to solve the above-described problems, and therefore, has an object to provide a vehicle peripheral-area display apparatus capable of monitor-displaying not only a road surface of a lower portion of a vehicle body of a vehicle, but also a peripheral-area of the vehicle, which has been picked up in the past, even when such plural cameras used to pick up all of peripheral-areas of this vehicle are not mounted.

DISCLOSURE OF THE INVENTION

To achieve the above-described object, a vehicle peripheral-area display apparatus of the present invention is featured by comprising: an image pick-up means for picking up images of a peripheral area of a vehicle; a positional information detecting means for detecting the own vehicle position of the vehicle as positional information; a data storage means for storing thereinto both picture data as to the peripheral area of the vehicle, which is picked up by the pick-up means, and also the positional information of the picked up vehicle; a picture composite means for reading out picture data corresponding to the positional information detected by the positional information detecting means from the data storage unit, and for combining the read picture data with such picture data indicative of a shape of the vehicle; and a display control means for causing the picture data combined in the picture composite means to be displayed on a display means.

As a consequence, in accordance with the vehicle peripheral-area display apparatus of the present invention with employment of the above-described structure, while both the picture data as to the picked up peripheral area of the vehicle, and also the positional information of the vehicle acquired during this pick-up operation are sequentially stored into the data storage means, the picture data corresponding to the positional information detected by the positional information detecting means is read out from the data storage means, and then, this read picture data is combined with such a picture data indicative of the shape of the vehicle. This combined picture data is displayed on the display means. As a consequence, even when a plurality of cameras which may pick up all of the peripheral areas of the vehicle are not mounted on the vehicle, not only the road surface of the lower portion of the vehicle body of the vehicle can be monitor-displayed, but also the past pictures of the peripheral area of the vehicle can be monitor-displayed.

The vehicle peripheral-area display apparatus of the present invention is featured by comprising: a picture data comparing means for comparing present picture data as to the peripheral area of the vehicle picked up by the image pick-up means with the picture data which is stored in the data storage unit and corresponds to the positional information of the picked up vehicle; and in that the positional information detecting means corrects the detected present positional information based upon the comparison result of the picture data comparing means.

As a consequence, in accordance with the vehicle peripheral-area display apparatus, the present picture data as to the picked up peripheral area of the vehicle is compared with the picture data which is stored in the data storage means and corresponds to the positional information of the picked up images of vehicle, and then, the present positional information is corrected based upon this comparison result, so that the precision of this present positional information of the vehicle can be increased.

The vehicle peripheral-area display apparatus of the present invention is featured by that the positional information detecting means is comprised of: a steering, amount detecting means for detecting a steering amount equivalent to a steering angle of the vehicle; a travel distance detecting means for detecting a travel amount equivalent to a travel distance of the vehicle; and an integration processing means for performing an integration process operation with respect to both the steering amount detected by the steering amount detecting means and the travel amount detected by the travel distance detecting means, whereby the own vehicle position of the vehicle is calculated as positional information.

As a consequence, in accordance with the vehicle peripheral-area display apparatus, since the integration process operation is carried out with respect to both the steering amount of the vehicle and the travel amount of this vehicle, the own vehicle position of the vehicle can be simply calculated as the positional information.

The vehicle peripheral-area display apparatus of the present invention is featured by comprised of: a picture data comparing means for comparing present picture data as to the peripheral area of the vehicle picked up by the image pick-up means with the picture data which is stored in the data storage means and corresponds to the positional information of the picked up images of vehicle; and a correction coefficient calculating means for calculating a correction coefficient for the integration process operation executed by the integration processing unit so as to correct the present positional information based upon an error of a portion where the present picture data is overlapped with the past picture data by the picture data comparing means.

As a consequence, in accordance with the vehicle peripheral-area display apparatus of the present invention, while the present picture data and the past picture data are compared with each other, which are related to the peripheral-area of the vehicle picked up by the image pick-up means, the correction coefficient of the integration process operation is calculated based upon the error contained in the portion where the present picture data is overlapped with the past picture data. As a consequence, the calculation precision of the positional information performed by the integration processing means 21 can be largely improved.

The vehicle peripheral-area display apparatus of the present invention is featured by that the picture composite means produces three-dimensional picture data based upon both the picture data corresponding to the present position information and picture data corresponding to such positional information located adjacent to the present positional information, and also combines the three-dimensional picture data with the picture data of the vehicle.

Accordingly, in accordance with the vehicle peripheral-area display apparatus of the present invention, while the picture composite means produces the three-dimensional picture data based upon the present positional information and also a plurality of picture data corresponding to the positional information located adjacent to this present positional information, this three-dimensional picture data is combined with the picture data of the own vehicle, so that the three-dimensional picture can be monitor-displayed.

The vehicle peripheral-area display apparatus of the present invention is featured by that the vehicle peripheral-area display apparatus is comprised of: a picture map producing means for producing a picture map based upon a plurality of positional information and also past picture data corresponding to the respective positional information, which are stored in the data storage means; and the display control means displays the picture map produced by the picture map producing means on the display means.

As a consequence, in accordance with the vehicle peripheral-area display apparatus of the present invention, while the picture map is produced based upon a plurality of positional information and also the past picture data corresponding to the respective positional information, which are stored in the data storage means, this produced picture map is displayed on the display means. As a result, such a real picture which could not be conventionally obtained may be utilized as the map, so that utilization of the user can be greatly improved.

The vehicle peripheral-area display apparatus of the present invention is featured by that the image pick-up means is comprised of: a backward image pick-up means for picking up a backward scene of the vehicle; a forward image pick-up means for picking up a forward scene of the vehicle; a travel direction detecting means for detecting a travel direction of the vehicle; and a control means for executing the image pick-up operation only by the forward image pick-up means when the travel direction detecting means detects a forward travel of the vehicle, and also for executing the image pick-up operation only by the backward image pick-up means when the travel direction detecting means detects a backward travel of the vehicle.

As a consequence, in accordance with the vehicle peripheral-area display apparatus of the present invention, the control means executes the image pick-up operation only by the forward image pick-up means when the traveling direction detecting means detects the forward travel of the vehicle whereas the control means performs the image pick-up operation only by the backward image pick-up means when traveling direction detecting means detects the backward travel of the vehicle. As a result, even when the user does not perform the switching operation between the backward image pick-up means and the forward image pick-up means, larger numbers of picture data are acquired, so that the traveling direction detecting effect can be furthermore improved.

It should be understood that in these drawings, reference numeral 1 shows a vehicle peripheral-area display apparatus; reference numeral 11 represents a camera (image pick-up means) reference numeral 12 indicates a vehicle sensor (positional information detecting means); reference numeral 12a denotes a steering sensor (steering amount detecting means); reference numeral 12b is a wheel rotation sensor (drive distance detecting means); reference numeral 15 shows a memory (data storage means); reference numeral 15a indicates a picture memory area (data storage means); reference numeral 16 represents a monitor display unit (display means); reference numeral 20 is a CPU; reference numeral 21 represents an integration processing unit (integration processing means); reference numeral 24 represents a memory control unit (picture composite means); reference numeral 25 denotes a picture composite process unit (picture composite means); reference numeral 26 indicates a display control unit (display control means); reference numeral 27 represents a picture data comparing process unit (picture data comparing means); reference numeral 28 shows a correction coefficient calculating unit (correction coefficient calculating means); reference numeral 29 shows a picture three-dimensional processing unit (picture composite means); and reference numeral 30 indicates a picture map producing unit (picture map producing means).

BEST MODE FOR CARRYING OUT THE INVENTION

Figure 1:
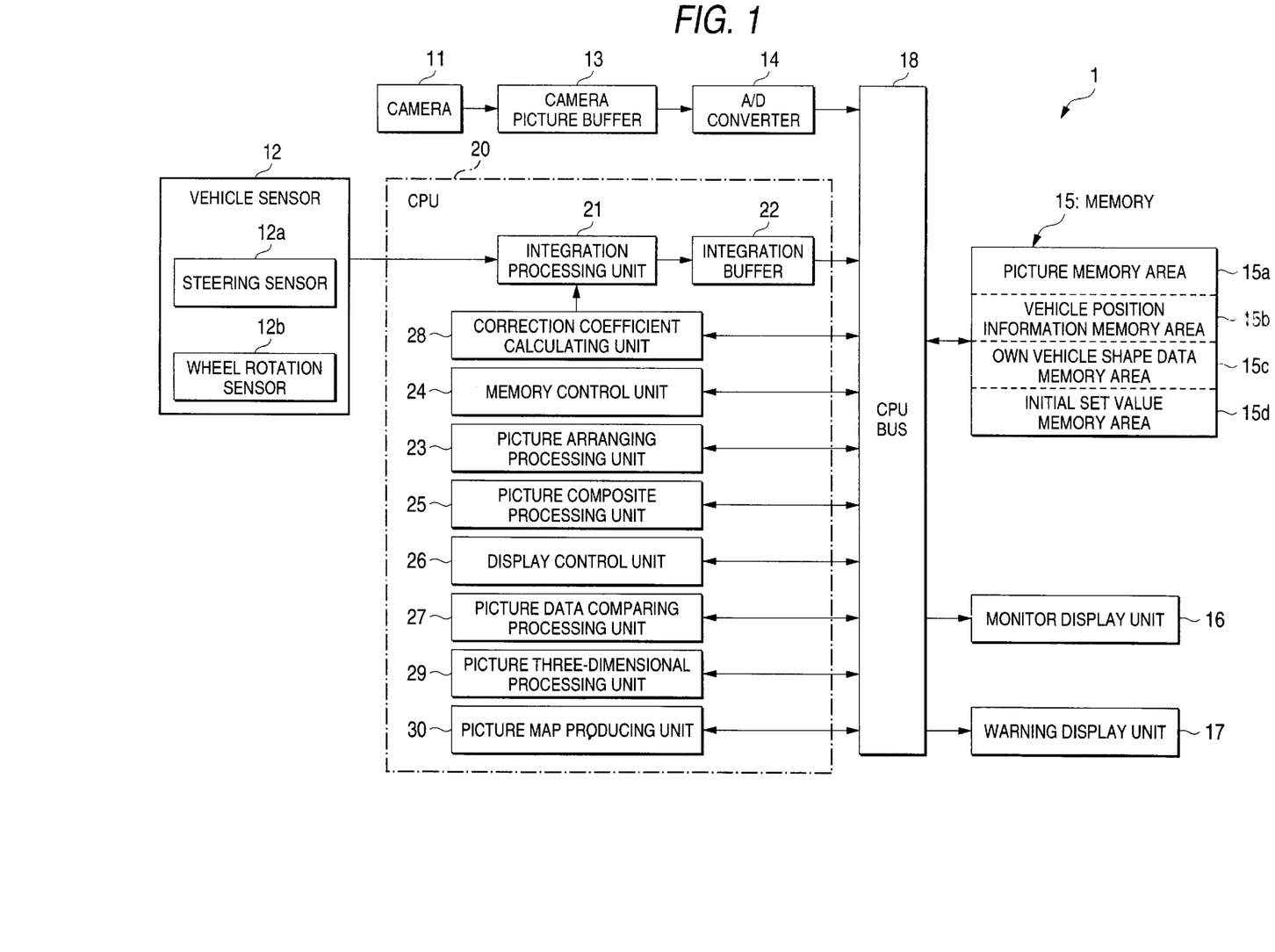
FIG. 1 is a block diagram for shows a schematic arrangement side a vehicle peripheral-area display apparatus according to an embodiment of the present invention.
Figure 2:
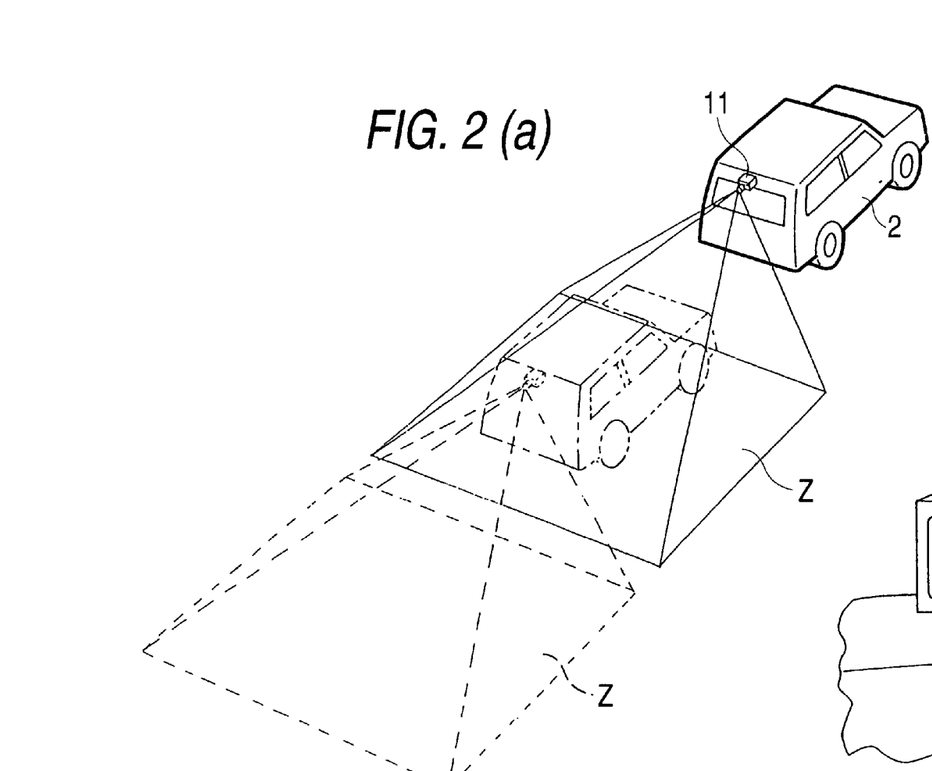
FIG. 2 is an explanatory diagram for representing a use condition of a vehicle which employs the vehicle peripheral-area display apparatus according to this embodiment.

Referring now to drawings, a description will now be made of a vehicle peripheral-area display apparatus according to an embodiment of the present invention. FIG. 1 is a block diagram showing a schematic arrangement inside a vehicle peripheral-area display apparatus according to an embodiment of the present invention. FIG. 2 is an explanatory diagram for representing a schematic structure of: a vehicle which employs the vehicle peripheral-area display apparatus according to this embodiment.

The vehicle peripheral-area display apparatus 1 shown in FIG. 1 is arranged by employing a camera 11 corresponding to an image pick-up means for picking up images of a peripheral area of a vehicle 2, a vehicle sensor 12 used to detect the own vehicle position of the vehicle 2 as positional information, a camera picture buffer 13 for buffering picture data (video data) of the peripheral area of the vehicle 2 picked up by the camera 11, an A/D converter 14 for converting the picture data buffered in this camera picture buffer 13 into digitally converted picture data, and a memory 15 corresponding to a data storage means for sequentially storing thereinto the digitally-converted picture data, and also for storing thereinto various data. The vehicle peripheral-area display apparatus 1 is further arranged by employing a monitor display unit 16 corresponding to a display means for displaying thereon various picture data, a warning display unit 17 for displaying a warning notice and the like, and a CPU 20 for controlling an entire arrangement of the vehicle peripheral-area display apparatus 1 via a CPU bus 18.

The vehicle sensor 12 includes a steering sensor 12a and a wheel rotation sensor 12b. The steering sensor 12a corresponds to a steering amount detecting means for detecting a steering amount which is equivalent to a steering angle of the vehicle 2. The wheel rotation sensor 12b corresponds to a drive distance detecting means for detecting a drive amount (travel amount) which is equivalent to a drive distance of the vehicle 2.

The CPU 20 includes an integration processing unit 21, an integration buffer 22, a picture arranging process unit 23, a memory control unit 24, a picture composite process unit 25, a display control unit 26, a picture data comparing process unit 17, and also a correction coefficient calculating unit 28. The integration processing unit 21 corresponds to an integration processing means for executing an integration process operation with respect to both the steering amount detected by the steering sensor 12a and the drive amount detected by the wheel rotation sensor 12b so as to calculate the own vehicle position of the vehicle 2 as positional information.

The integration buffer buffers the calculated positional information. The picture arranging process unit 22 executes a changing process operation of a camera view angle with respect to the picture data stored in the memory 15. The memory control unit 24 corresponds to a picture composite means for storing/controlling the picture data into the memory 15 in correspondence with the positional information acquired by picking up this picture data. The picture composite process unit 25 corresponds to a picture composite means in which while the past picture data corresponding to the present positional information is read out from the memory 15 under control of the memory control unit 24, this picture composite means combines vehicle shape data "X" as shown in FIG. 2(b) with this past picture data. The display control unit 26 corresponds to a display control means for displaying the picture data combined by this picture composite process unit 25 on the monitor display unit 16. The picture data comparing process unit 27 corresponds to a picture data comparing means for comparing present picture data of the peripheral area of the vehicle 2 picked up by the camera 11 with past picture data which corresponds to present positional information as to the picked up images of peripheral area of the vehicle 2. Also, the correction coefficient calculating unit 28 corresponds to a correction coefficient calculating means for calculating a correction coefficient of the integration process by the integration processing unit 21 in order that the present positional information should be corrected based upon such an error of an overlapped portion between the present picture data and the past picture data in this picture data comparing process unit 27.

Furthermore, this CPU 20 includes a picture three-dimensionally processing unit 29, and a picture map producing unit 30c. This picture three-dimensionally processing unit 29 corresponds to such a picture composite means which produces three-dimensional picture data in the following manner. That is, a positional change of the same target point on the display screen, which is related to the same image pick-up target, is obtained from two sets of picture data with respect to positional information located adjacent to each other, and then, a three-dimensional coordinate value of the target point is obtained from a travel distance of the vehicle 2 and from the positional change appeared on the display screen. Also, the picture map producing unit 30 corresponds to a picture map producing means for producing a picture map based upon a plurality of positional information, and the past picture data corresponding to the respective positional information stored in the memory 15.

The memory 15 includes a picture memory area 15a, a positional information memory area 15b, an own vehicle shape data memory area 15c, and an initial setting value memory area 15d. The picture memory area 15a sequentially stores thereinto the picture data picked up by the camera 11. The positional information memory area 15b stores thereinto the positional information of the vehicle 2 in correspondence with the picture data when this picture data: is picked up. The own vehicle shape data memory area 15c stores thereinto own vehicle shape data "X" of the vehicle 2, which is combined by the picture composite process unit 25. The initial setting value memory area 15d stores thereinto initial setting values as to a setting position of the camera 11, a view angle of the camera 11, a distortion specification of the camera 11, and display range specifications of the monitor display unit 16, which may depend upon an automatic/manual drive mode and a vehicle speed direction.

FIG. 2 is an explanatory diagram for explaining an outer-view construction of the vehicle 2 which employs the vehicle peripheral-area display apparatus 1 according to this embodiment.

As shown in FIG. 2(a), while the camera 11 for picking up images of a backward range "Z" of this vehicle 2 is installed on a rear portion of this vehicle 2, the monitor display unit 16 is equipped within a driver's seat of the vehicle 2 in order that a picture picked up by the camera 11 may be displayed on the monitor display unit 26.

Figure 3:
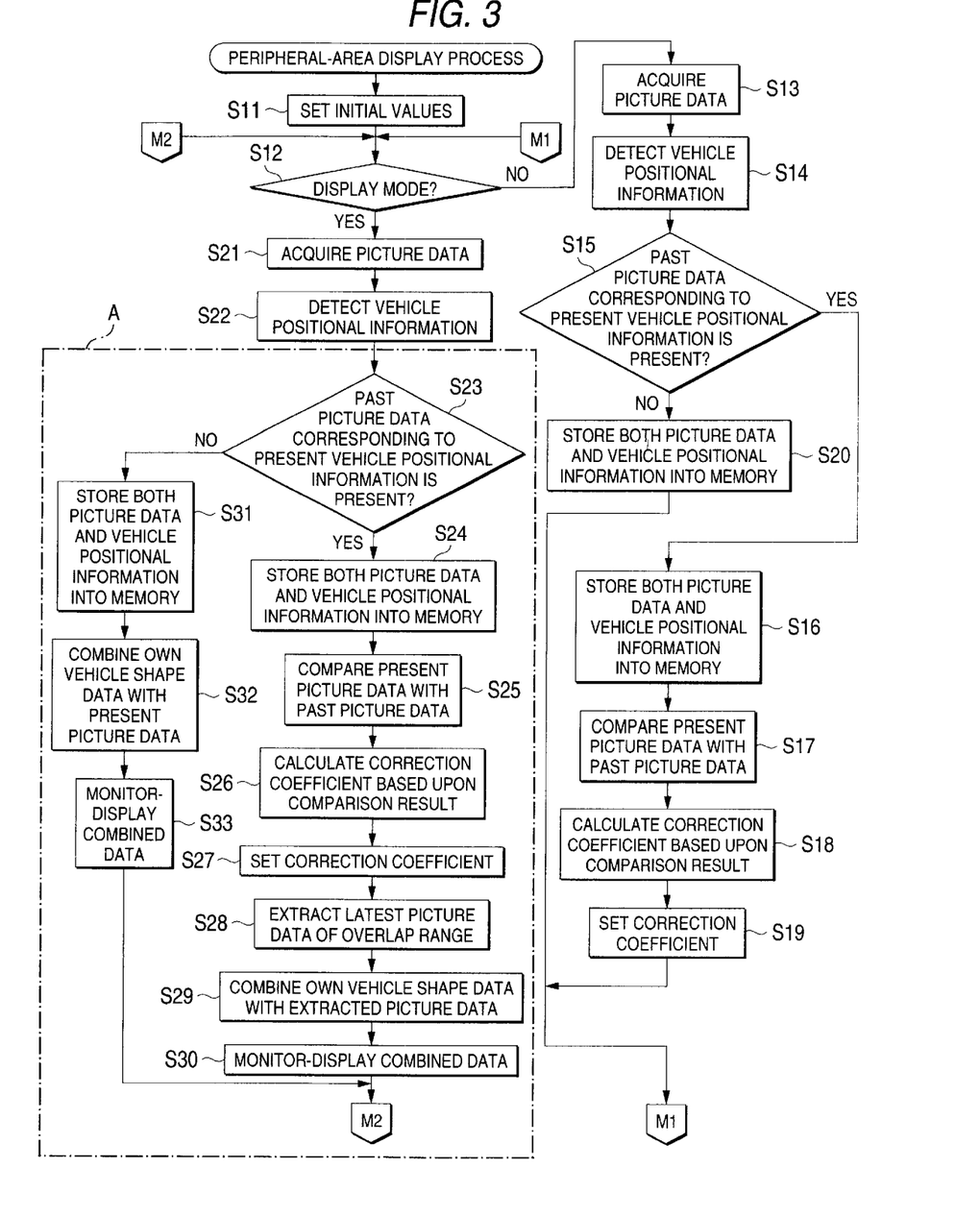
FIG. 3 is a flow chart for describing a process operation of a CPU related to a peripheral-area display apparatus according to this embodiment.

Next, operations of the vehicle peripheral-area display apparatus 1 according to the present embodiment will now be explained. FIG. 3 is a flow chart for explaining process operations of the CPU 20 related to a peripheral-area display process operation executed by the vehicle peripheral-area display apparatus 1 according to this embodiment.

The above-explained "peripheral-area display process operation" defined in FIG. 3 explains the following process operation. That is, normally, both picture data of a peripheral-area of the vehicle 2, which is picked up by the camera 11, and positional information of the vehicle 2, which corresponds to a image pick-up position of this peripheral area of the vehicle 2, are stored into the memory 11 in correspondence with these picture data and positional information. Furthermore, when the CPU judges such a fact that past picture data corresponding to the present positional information is stored into the memory 15, the picture data "X" of the own vehicle shape is combined with this past picture data, and thus, this composite picture data is displayed on the monitor display unit.

The CPU 20 indicated in FIG. 3 executes an initial setting operation (step S11). That is, this CPU20 reads out the initial setting value which has been stored in the initial setting value memory area 15d, for instance, since the display range specification of the monitor display unit 16 is set, the CPU 20 may set the display range of the monitor display unit 16. Alternatively, for example, since the CPU 20 sets the camera angle, the distortion specification, the camera setting position, and the camera setting direction, the camera specification may be set.

After the CPU 20 executes the initial setting operation, the CPU 20 judges as to whether or not the present mode corresponds to such a display mode in which the peripheral area of the vehicle 2 is monitored/displayed on the monitor display unit 16 (step S12). It should be noted that the mode such as the display mode may be set by manipulating an operation key prepared on the monitor display unit 16.

When the CPU 20 judges that the present mode is not equal to the display mode, the CPU 20 judges that the present mode corresponds to a picture acquisition mode in which a picture of a peripheral area of the vehicle 2 is merely acquired without performing the monitor display operation. Thus, the CPU 20 acquires picture data which are sequentially picked up by the camera 11, and buffers these acquired picture data into the camera picture buffer 13 (step S13).

Furthermore, the integration processing unit 21 of the CPU 20 performs the integration processing operation with respect to both a steering amount sensed by the steering sensor 12a and a drive amount sensed by the wheel rotation sensor 12 in order to detect a vehicle position picked up by this camera 11. As a result, the integration processing unit 21 of the CPU 20 detects present positional information of the vehicle (step S14).

The memory control unit 24 of the CPU 20 judges as to whether or not the past picture data which corresponds to the present positional information of the detected vehicle is stored into the picture memory area 15a (step S15).

In the case that the memory control unit 24 judges such a fact that the picture data corresponding to the present positional information is stored in the picture memory area 15a, the memory control unit 24 digitally converts the picture data by the A/D converter 14, which has been buffered into the camera picture buffer 13 at the step S13, and then stores this digitally-converted picture data into the picture memory area 15a. Also, the memory control unit 24 stores the positional information of the vehicle detected at the step S14 into the vehicle positional information memory area 15b in correspondence with this stored picture data (step S16).

Furthermore, the picture data comparing process unit 27 compares the present picture data corresponding to this vehicle positional information with the past picture data, so that this picture data comparing process unit 27 detects an error in such a portion where the present picture data is overlapped with the past picture data (step S17).

The correction coefficient calculating unit 28 calculates a correction efficient for the integration process operation by the integration processing unit 21 in order that the present positional information is corrected based upon the error detected by the picture data comparing process unit 27 (step S18). Then, the correction coefficient calculating unit 28 sets this calculated correction coefficient to the integration processing unit 21 (step S19) The process operation is advanced to a process step "M1" shown in this drawing so as to furthermore acquire pictures.

Also, in such a case that the memory control unit 24 judges that the past picture data corresponding to the present vehicle position is not stored at the step S15, this memory control unit 24 stores the picture data acquired at the step S13 into the picture memory area 15a, and also stores the present positional information of the vehicle detected at the step S14 into the vehicle positional information memory area 15b (step S20). Then, the process operation is advanced to the process step "M1" shown in this drawing in order to furthermore acquire pictures.

Also, when the CPU 20 judges that the present mode corresponds to the display mode at the step S12, the CPU 20 buffers the picture data picked up by the camera 11 into the camera picture buffer 13 (step S21), and furthermore, makes the integration processing unit 21 to detect present positional information of the vehicle 2 (step S22).

The memory control unit 24 judges as to whether or not such past picture data corresponding to the present vehicle positional information is stored in the picture memory area 15a (step S23).

When the memory control unit 24 judges such a fact that the past picture data corresponding to the present vehicle position information is stored in the picture memory area 15a, the memory control unit 24 stores the picture data acquired at the step S20 into the picture memory area 15a, and stores the present positional information detected at the step S21 into the vehicle positional information memory area 15b in correspondence with this picture data (step S24).

Furthermore, the picture data comparing process unit 27 compares the present picture data corresponding to this vehicle positional information with the past picture data, so that this picture data comparing process unit 27 detects an error in such a portion where the present picture data is overlapped with the past picture data (step S25).

The correction coefficient calculating unit 28 calculates a correction efficient for the integration process operation by the integration processing unit 21 in order that the present positional information is corrected based upon the error detected by the picture data comparing process unit 27 (step S26). Then, the correction coefficient calculating unit 28 sets this calculated correction coefficient to the integration processing unit 21 (step S27).

In addition, the picture composite process unit 25 produces a composite picture data from the past picture data and the present picture data. Then, the picture composite process unit 25 produces a picture data of a peripheral area of the vehicle 2 to be displayed on the monitor display unit 16 by selecting a present picture date in the range where the past picture data is overlapped with the present picture data. (step S28).

Furthermore, the picture composite process unit 25 reads the own vehicle shape data "X" under storage into the own vehicle shape data memory area 15c, and then, combines this own vehicle shape data "X" with the picture data which is produced at the previous step S28 (step S29).

The display control unit 26 displays the picture data combined at the step S29 on the monitor display unit 26 (step S30). Then, the process operation is advanced to a process step "M2" in this drawing so as to further acquire a picture.

It should be understood that although such a picture of the lower portion of the vehicle 2 could not be displayed on the monitor as to the picture data acquired in real time in the conventional system, this picture can be displayed on the monitor by using the past picture data in the present invention.

When the memory control unit 24 judges such a fact that the past picture data corresponding to the present vehicle position information is not stored in the picture memory area 15a, the memory control unit 24 stores the picture data acquired at the step S21 into the picture memory area 15a, and stores the present positional information detected at the step S22 into the vehicle positional information memory area 15b in correspondence with this picture data (step S31).

Furthermore, the picture composite process unit 25 reads the own vehicle shape data "X" under storage into the own vehicle shape data memory area 15c, and then, combines this own vehicle shape data "X" with the picture data which corresponds to the present vehicle positional information (step S32).

The display control unit 26 monitor-displays the picture data combined at the step S32 on the monitor display unit 16 (step S33). Then, the process operation is advanced to a process step "M2" in this drawing so as to further acquire a picture.

Figure 4:
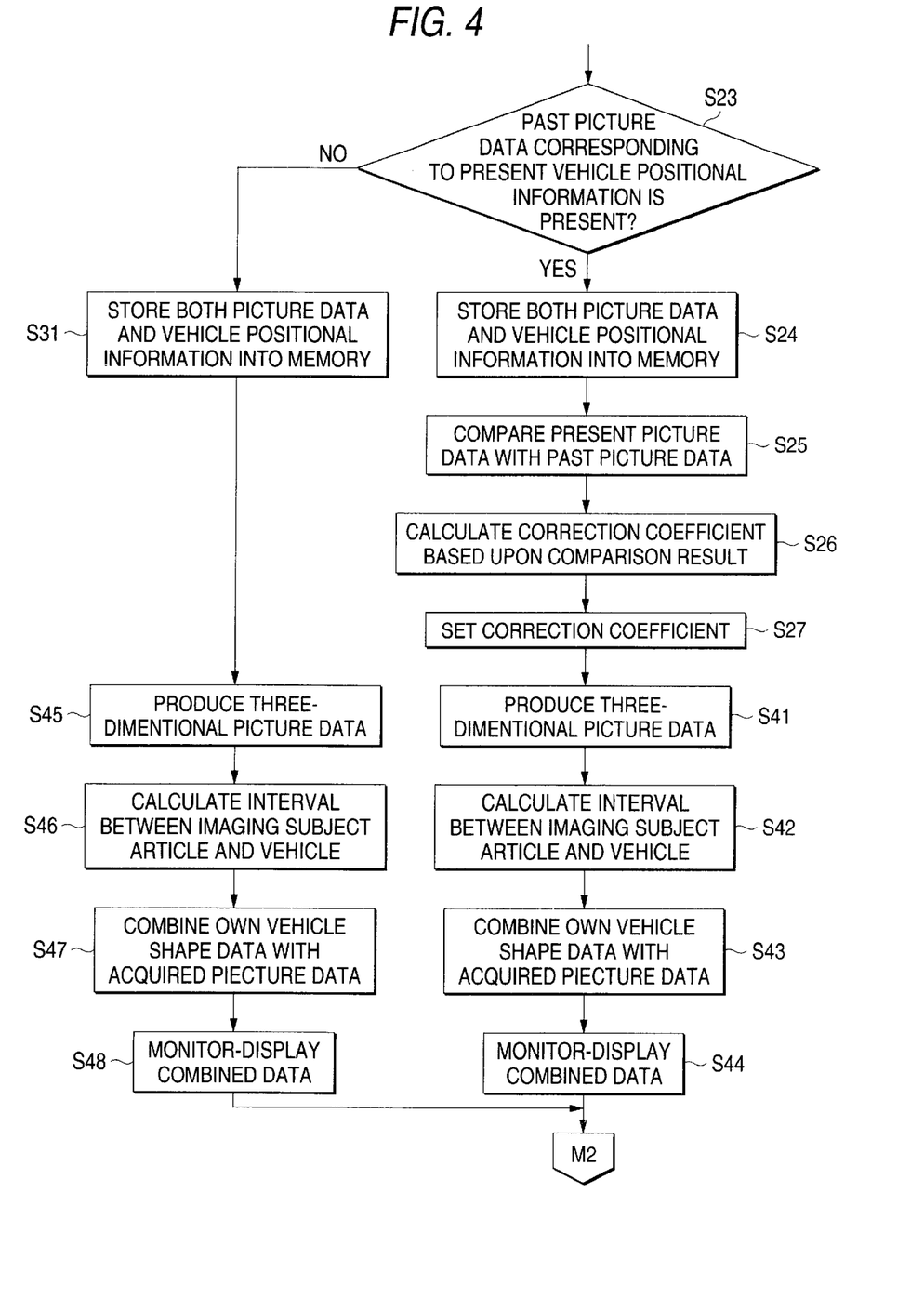
FIG. 4 is a flow chart for describing a process operation of the CPU in such a case that a plane display is converted into a three-dimensional display in a peripheral-area display process operation according to this embodiment.

It should also be noted that in accordance with the peripheral-area display process operation shown in FIG. 3, the pictures displayed on the monitor display unit 16 are the two-dimensionally-displayed pictures. Alternatively, since the process operation "A" indicated in FIG. 3 is replaced with a process operation as shown in FIG. 4, this picture may be three-dimensionally displayed. FIG. 4 is a flow chart for describing a process operation executed by the CPU 20 related to a three-dimensional representation.

This three-dimensional display process operation may be initiated by entering, for instance, a three-dimensional display initiation key prepared in the operation key of the monitor display unit 16.

As indicated in FIG. 4, after the process operation defined at the steps S23, S24, S25, S26, and S27 are carried out, the picture three-dimensionally processing unit 29 produces three-dimensional picture data in the following manner (step S41). That is, this picture three-dimensionally processing unit 29 compares the picture data corresponding to the present positional information being presently stored in the picture memory area 15a with such a picture data corresponding to positional information which is located adjacent to this present positional information so as to acquire a positional change of the same target point on the display screen from these two sets of picture data. The same target point is related to the same imaging target subject. Then, the three-dimensionally processing unit 29 produces three-dimensional picture data by acquiring a three-dimensional coordinate value of the target point based upon both the travel distance (drive distance) of the vehicle 2 and the positional change on the display screen.

Furthermore, the picture three-dimensionally processing unit 29 calculates an interval between this imaging target article and the vehicle (step S42). The picture composite process unit 25 combines the own vehicle shape data "X" read out from the own vehicle shape data memory area 15c with the produced three-dimensional picture data based upon the interval between the imaging target article and the vehicle, which is calculated in the picture three-dimensionally processing unit 29 (step S43).

Then, the picture composite process unit 25 displays this combined three-dimensional picture data on the monitor display unit 16 (step S44), and the process operation is advanced to the process step "M2" indicated in FIG. 3.

Also, after the process operations defined at the step S23 and S31 are carried out, the picture three-dimensionally processing unit 29 produces three-dimensional picture data in the following manner (step S45). That is, this picture three-dimensionally processing unit 29 compares the picture data corresponding to the present positional information being presently stored in the picture memory area 15a with a picture data corresponding to positional information which is located adjacent to this present positional information so as to acquire a positional change of the same target point on the display screen from these two sets of picture data. The same target point is related to the same imaging target subject. Then, the three-dimensionally processing unit 29 produces three-dimensional picture data by acquiring a three-dimensional coordinate value of the target point based upon both the travel distance (drive distance) of the vehicle 2 and the positional change on the display screen.

Furthermore, the picture three-dimensionally processing unit 29 calculates an interval between this target article and the vehicle (step S46). The picture composite process unit 25 combines the own vehicle shape data "X" read out from the own vehicle shape data memory area 15c with the produced three-dimensional picture data based upon the interval between the imaging target article and the vehicle, which is calculated in the picture three-dimensionally processing unit 29 (step S47).

Then, the picture composite process unit 25 displays this combined three-dimensional picture data on the monitor display unit 16 (step S48), and the process operation is advanced to the process step "M2" indicated in FIG. 3.

It should also be noted that in order to combine the own vehicle shape data "X" with the three-dimensional picture data, the interval between the imaging target article and the vehicle is calculated at the steps S42 and S46. Furthermore, since such an interval is calculated, when the CPU 20 thereafter senses such a fact that the vehicle 2 is approached to this imaging target article, this CPU 20 may notify via the warning display unit 17 to the user, such a warning notice that the vehicle most probably collides with the imaging target subject. Also, this CPU 20 may notify a steering guide for avoiding this collision via the warning display unit 17 to the user as to a collision-avoiding-measure indication.

Alternatively, in accordance with this embodiment, since both the picture data and the vehicle positional information are utilized which are stored in the picture memory area 15a and the vehicle positional information memory area 15b, the below-mentioned picture map may be formed.

The picture map producing unit 30 of the CPU 20 produces a picture map based upon the positional information stored in the picture memory area 15a, and also the past picture data which are stored in the vehicle positional information memory area 15b, and correspond to the respective positional information.

The display control unit 26 displays the picture map produced by the picture map producing unit 30 on the monitor display unit 16.

In accordance with this embodiment, while the picture data as to the peripheral area of the vehicle 2 and also the positional information of the vehicle acquired when these pictures are picked up are sequentially stored into both the picture memory area 15a and the vehicle positional information memory area 15b, the past picture data corresponding to the present positional information of the vehicle 2 is read out from the picture memory area 15a. Then, the own vehicle shape data "X" is combined with this past picture data, and this combined picture data is displayed on the monitor display unit 16. As a result, even when a plurality of cameras 11 used to pick up all of the peripheral areas of the vehicle 2 are not mounted, not only the road surface of the lower portion of the vehicle body of this vehicle 2 can be displayed on the monitor, but also the peripheral area of the vehicle 2 picked up in the past stage can be displayed on the monitor.

As previously explained, since the load surface of the lower portion of the vehicle body of this vehicle 2 can be displayed on the monitor, for example, in such a case that the vehicle 2 is stored into a garage, this garaging work of the vehicle 2 can be smoothly carried out by observing the monitor screen.

Also, in accordance with this embodiment, while the present picture data and the past picture data are compared with each other, which are related to the present positional information of the vehicle 2, the correction coefficient of the integration process operation is calculated based upon the error contained in the portion where the present picture data is overlapped with the past picture data. As a consequence, the calculation precision of the positional information performed by the integration processing unit 21 can be largely improved.

Also, in accordance with this embodiment, while the three-dimensional picture data is produced based upon the present positional information and also a plurality of picture data corresponding to the positional information located adjacent to this present positional information, this three-dimensional picture data is combined with the own vehicle shape data "X", so that the three-dimensional picture can be displayed on the monitor.

Further, in accordance with this embodiment, while the picture map is produced based upon a plurality of positional information stored in the picture memory area 15a and also, the past picture data corresponding to the respective positional information, which are stored in the vehicle positional information memory area 15b, this picture map is displayed on the monitor display unit 16. As a consequence, such a real picture which could not be conventionally obtained may be utilized as the map, so that utilization of the user can be greatly improved.

It should also be noted that in accordance with the above-explained embodiment, a description is made of such an example that the camera 11 is installed on the rear portion of the vehicle 2. Alternatively, if the vehicle peripheral-area display apparatus is equipped with a backward image pick-up means, a forward image pick-up means, and further, the CPU 20 is equipped with a traveling direction detecting means, and also a control means, then this vehicle peripheral-area display apparatus may acquire larger numbers of picture data without the switching operation by the user as to the backward image pick-up means and the forward image pick-up means, resulting in a higher effect. This backward image pick-up means functions as a camera for picking up pictures of the backward range of the vehicle 2. The forward image pick-up means functions as a camera for picking up pictures of the forward range of the vehicle 2. The traveling direction detecting means detects the traveling direction of the vehicle 2 by detecting, for example, a gear range of the vehicle 2.

The control means executes the image pick-up operation only by the forward image pick-up means when the traveling direction detecting means detects the forward travel of the vehicle 2, whereas the control means performs the image pick-up operation 5 only by the back ward image pick-up means when traveling direction detecting means detects the backward travel of the vehicle 2.

Also, in accordance with the above-explained embodiment, the peripheral areas of the traveling vehicle 2 are stored as the picture data into the picture memory area 15a. As a result, after the traveling operation of the vehicle 2 is stopped, the contents of this picture memory area 15a may be reproduced on the monitor display unit 16 in response to a predetermined operation. For instance, in such a case that this vehicle peripheral-area display apparatus is employed in a vehicle used in an automobile training school, since a trainee observes a picture displayed on the monitor display unit 16, this trainee can objectively recognize own driving conditions.

INDUSTRIAL APPLICABILITY

In accordance with the vehicle peripheral-area display apparatus of the present invention with employment of the above-described structure, while both the picture data as to the picked up pictures of peripheral area of the vehicle, and also the positional information of the vehicle acquired during this image pick-up operation are sequentially stored into the data storage means, the picture data corresponding to the present positional information of the vehicle is read out from the data storage means, and then, this read picture data is combined with such a picture data indicative of the shape of the vehicle. This combined picture data is displayed on the display means. As a consequence, even when a plurality of cameras which may pick up all of the peripheral areas of the vehicle are not mounted on the vehicle, not only the road surface of the lower portion of the vehicle body of the vehicle can be monitor-displayed, but also the past pictures of the peripheral area of the vehicle can be monitor-displayed.

What is claimed is:

1. A vehicle peripheral-area display apparatus comprising:
   an image pick-up unit for picking up images of a peripheral area of a vehicle;
   a positional information detecting unit for detecting the own vehicle position of said vehicle as positional information;
   a data storage unit for storing picture data of the peripheral area of the vehicle, the picture data is picked up by said image pick-up unit, and also storing said positional information of the vehicle;
   a picture composite unit for reading out picture data corresponding to the positional information detected by said positional information detecting unit from said data storage unit, and for combining said read picture data with such picture data indicative of a shape of said vehicle; and
   a display control unit for causing the picture data combined in said picture composite unit to be displayed on a display unit.

2. A vehicle peripheral-area display apparatus as claimed in claim 1 further comprising:
   a picture data comparing unit for comparing present picture data as to the peripheral area of the vehicle picked up by said image pick-up unit with the picture data which is stored in said data storage unit and corresponds to the positional information of said vehicle,
   wherein said positional information detecting unit corrects the detected present positional information based upon the comparison result of said picture data comparing unit.

3. A vehicle peripheral-area display apparatus as claimed in claim 1, wherein said positional information detecting unit includes:
   a steering amount detecting unit for detecting a steering amount equivalent to a steering angle of said vehicle;
   a travel distance detecting unit for detecting a travel amount equivalent to a travel distance of said vehicle; and an integration processing unit for calculating the own vehicle position of said vehicle as positional information by performing an integration process operation with respect to both the steering amount detected by said steering amount detecting unit and the travel amount detected by said travel distance detecting unit.

4. A vehicle peripheral-area display apparatus as claimed in claim 3 further comprising:

a picture data comparing unit for comparing present picture data of the peripheral area of the vehicle picked up by said image pick-up unit with the picture data which is stored in said data storage unit and corresponds to the positional information of said vehicle; and a correction coefficient calculating unit for calculating a correction coefficient for the integration process operation executed by said integration processing unit so as to correct the present positional information based upon an error of a portion where the present picture data is overlapped with the past picture data by said picture data comparing unit.

5. A vehicle peripheral-area display apparatus as claimed in claim 1, wherein said picture composite unit produces three-dimensional picture data based upon the picture data corresponding to the present position information and picture data corresponding to such positional information located adjacent to said present positional information, and also combines said three-dimensional picture data with the picture data of the vehicle.

6. A vehicle peripheral-area display apparatus as claimed in claim 1 further comprising:

a picture map producing unit for producing a picture map based upon a plurality of positional information and also past picture data corresponding to the respective positional information, which are stored in said data storage unit, wherein said display control unit displays said picture map produced by said picture map producing unit on said display unit.

7. A vehicle peripheral-area display apparatus as claimed in claim 1, wherein said image pick-up unit includes:

a backward image pick-up unit for image pick-up a backward scene of said vehicle;

a forward image pick-up unit for image pick-up a forward scene of said vehicle;

a travel direction detecting unit for detecting a travel direction of said vehicle; and a control unit for executing the image pick-up operation only by said forward image pick-up unit when said travel direction detecting unit detects a forward travel of said vehicle, and also for executing the image pick-up operation only by said backward image pick-up unit when said travel direction detecting unit detects a backward travel of said vehicle.

* * * * *

UNITED STATES PATENT AND TRADEMARK OFFICE
CERTIFICATE OF CORRECTION

PATENT NO. : 6,515,597 B1  
DATED : February 4, 2003  
INVENTOR(S) : Jyoji Wada et al.

It is certified that error appears in the above-identified patent and that said Letters Patent is hereby corrected as shown below:

<u>Title page,</u>  
Item [22], PCT Filed:, please delete "Jan. 29, 2000", and insert therefor  
-- Jan. 29, 2001 --.

Signed and Sealed this

Twelfth Day of August, 2003

JAMES E. ROGAN  
*Director of the United States Patent and Trademark Office*